Sept. 12, 1939. J. FENTRESS 2,172,532
HOSE CONNECTION AND METHOD OF MAKING SAME
Filed Dec. 15, 1936
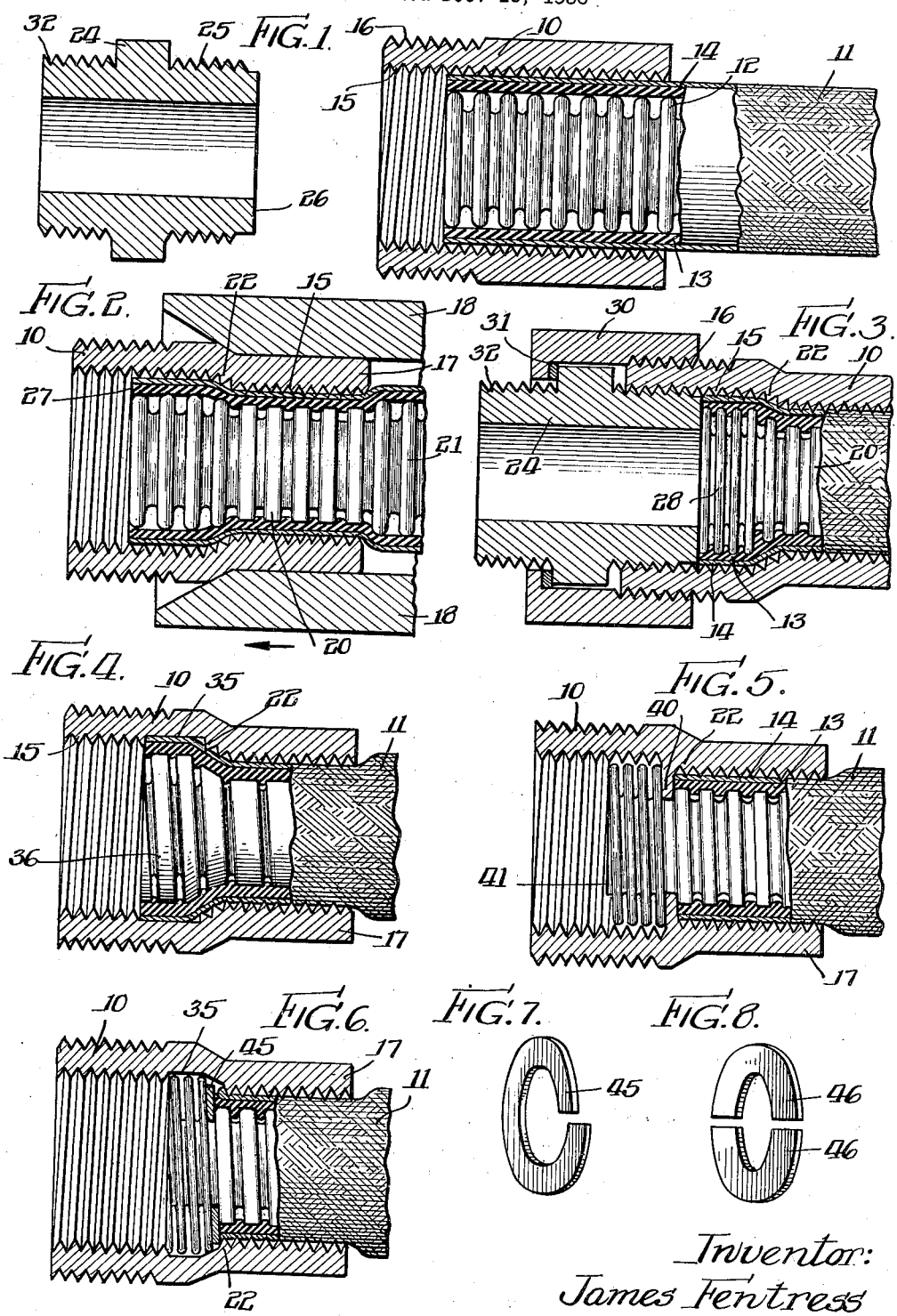
Inventor:
James Fentress
By:- Cox & Moore
attys.

Patented Sept. 12, 1939

2,172,532

UNITED STATES PATENT OFFICE 2,172,532

HOSE CONNECTION AND METHOD OF MAKING SAME

James Fentress, Hubbard Woods, Ill., assignor to Chicago Metal Hose Corporation, Maywood, Ill., a corporation of Illinois Application December 15, 1936, Serial No. 116,023

12 Claims. (Cl. 29—157)

This invention relates to a new and improved coupling construction for conduits or flexible hose, and to the method of assembling the coupling upon the hose end.

It is an object of the invention to provide a coupling construction for flexible conduits, hose or the like which may be readily constructed and applied to the hose end and which, when in assembled position upon the hose, provides a satisfactory and leak-proof connection and a connection which will resist accidental withdrawal of the hose end from the coupling as the assembly is subjected to pressure and use. A further object is to provide a new and improved method for assembling such coupling upon the hose whereby to form the hose connection.

More specifically the invention contemplates a connection of the type wherein the coupling is contracted into tight gripping engagement with the hose, corrugations being provided upon the coupling to produce a tight gripping engagement with the hose and a leak-proof joint. An important object of the invention is to provide in the construction means for reducing the external diameter of one hose section within the coupling and for increasing the external diameter of an adjacent hose section within the coupling and for locking the section of increased diameter against a suitable abutment formed upon the coupling body whereby to prevent withdrawal of the hose from the coupling. Still further objects are to provide for the thrusting of the hose section of increased diameter into tight and leak-proof gripping engagement with the coupling body, and to provide an efficient sealing means at the extreme hose end.

In certain forms of the invention additional means, such as a suitably formed rib or ring member, may be provided in anchored relation to the coupling and the hose for further securing the latter against withdrawal from the coupling under conditions of pressure and use.

Still other objects and advantages of the invention will be apparent from the following description when taken in connection with the accompanying drawing wherein certain preferred embodiments of the invention are illustrated and described.

In the drawing, wherein like reference numerals refer to like parts throughout:

Fig. 1 is an exploded sectional view showing the coupling parts as initially arranged in juxtaposition to the hose end and prior to final positioning and assembly thereon.

Fig. 2 is a view illustrating the contraction of the coupling body upon the hose.

Fig. 3 is a sectional view showing the completed coupling assembled upon the hose end.

Fig. 4 is a partial sectional view showing a modified form of coupling body applied to a hose.

Figs. 5 and 6 are views similar to Fig. 4 but showing further modified forms of couplings, and Figs. 7 and 8 are perspective views of split ring members adapted for use in the coupling construction of Fig. 6.

Referring first to Figs. 1, 2 and 3, wherein one preferred form of the invention is set forth for purposes of illustration, the coupling comprises a main cylindrical body member 10 adapted to be initially assembled upon the hose end as illustrated in Fig. 1. In this instance the hose or flexible conduit 11 is illustrated as composed of a piece of annular corrugated tubing 12 enclosed in a suitable covering such as a fabric covering 13 and an outer covering 14 of metallic braid, but it is to be understood that various forms of hose or flexible metallic conduit may be employed. The coupling main body member is preferably threaded along its entire bore as indicated at 15 and on its exterior surface at 16. The bore 20 of the coupling body member is sufficiently large so that the hose end may be readily slipped into position within the coupling as shown in Fig. 1.

After the positioning of the hose end within the main body member of the coupling, the outer end 17 of the body member is compressed or contracted into gripping engagement with the hose as indicated in Fig. 2. This contracting operation may be effected by forcing a split die 18 longitudinally of the coupling body a given distance whereby to deform and contract the end 17 of the body into gripping engagement with the hose, or other suitable contracting means such as compression rollers may be employed, as shown for example in my copending application Serial No. 78,507. The contraction of the coupling body member upon the hose causes those convolutions 20 of the metal tubing which are compressed by the contracted coupling portion 17, to be deformed and reduced in outer diameter to a size smaller than the diameter of the original and undeformed convolutions 21. At the same time the threads 15 of the contracted coupling portion are brought into tight gripping engagement with the hose and caused to bite into the metal braid 14 on the outer surface thereof whereby to hold the hose firmly within the coupling and to produce a fluid-tight seal. The contraction of the outer end of the coupling body also forms a shoulder in the inner bore of the coupling at the point indicated by the numeral 22.

After the contracting operation the clamping member 24, having threads 25 on the outer periphery thereof, is threaded into the end of the coupling body as shown in Fig. 3. In this operation the threads 25 of the clamping member are engaged with the threads 15 of the coupling body and the clamping member rotated to bring its face 26 into engagement with the extreme end 27 of the hose. Continued rotation of the clamping member causes the end convolutions 28 of the metal tubing to be axially compressed and at the same time increased in outer diameter whereby to thrust the hose wall and the metal braid 14 into tight gripping engagement with the threads 15 of the coupling body. The convolutions 28 of increased diameter are brought into locking engagement against the shoulder 22 of the coupling body, and at the same time a tight and effective seal is produced between the end face 26 of the clamping member and the extreme end 27 of the hose. After the clamping member has been rotated to assembled position, a suitable locking member 30 may be threaded upon the threads 16 of the coupling body whereby to lock the clamping member in adjusted position. Packing 31 may be arranged between the clamping member and the locking member to further seal the coupling against fluid leaks. The clamping member may also be threaded as indicated at 32 to facilitate the application of the coupling connection to other hose pieces or couplings.

It will be seen that the character of the coupling construction and its method of assembly are such that a fluid-tight seal for the hose is produced, and at the same time the hose is positively locked in position within the coupling body whereby to preclude its accidental withdrawal in use even when the assembly is subjected to relatively high pressures. The radial compression of the compressed tubing convolutions 20 and the radial expansion of the expanded tubing convolutions 28 causes the hose wall to be thrust into tight gripping engagement with the threads 15 of the coupling body, producing a fluid-tight seal and a connection which resists withdrawal of the hose from the coupling. The convolutions 20 are reduced to a diameter smaller than that of the normal convolutions 21 and the convolutions 28 are expanded to a diameter greater than the normal diameter. The convolutions 28 are thus firmly interlocked against the shoulder 22 formed in the coupling body by the contracting operation, positively preventing withdrawal of the hose from the coupling assembly. In order to withdraw the enlarged convolutions 28 through the contracted portion 17 of the coupling, it would be necessary to subject the hose to such pressures as would cause mutilation or deformation of the locking convolutions at the hose end. The inherent resiliency of the convolutions 28 causes the extreme end 27 to be thrust firmly into engagement with the face 26 of the clamping member producing an efficient and fluid-tight seal at the extreme hose end.

In Fig. 4 there is illustrated an embodiment of the invention generally similar to that previously described except that the coupling body has its bore threads 15 cut away at the point 35 whereby to produce a more pronounced locking shoulder at the point 22. Also the cut away portion 35 of the coupling produces an enlarged chamber into which the end convolutions of the hose may be thrust as the clamping member is moved against the hose end. In this instance the hose 11 is illustrated as having an inner core of spiral wound tubing 36 rather than of corrugated tubing as in the previously described embodiment of the invention.

In Fig. 5 there is illustrated another embodiment of the invention, also generally similar to the embodiment of Figs. 1, 2 and 3, except that a helical rib 40 is formed on the inner bore of the coupling body in proximity to the shoulder portion 22. In this instance the core of the hose may be helical corrugated tubing. The rib 40 may be formed upon the coupling body as the latter is initially cast or machined. In assembling the coupling connection in this form of the invention, the covering members 13 and 14 of the hose are removed from the hose end portion whereby to leave the extreme end convolutions 41 exposed. The hose is then arranged within the coupling body and the rib 40 threaded onto the spiral convolutions 41 a suitable distance as into engagement with the end of the covering material. The portion 17 of the coupling body is then contracted into gripping engagement with the hose, as previously described, whereby to form the shoulder 22 and to grip the hose tightly within the coupling. Thereafter the clamping member is threaded into the coupling body causing the axial compression and radial expansion of the tubing convolutions 41. The rib 40 extends to the base of the tubing convolutions and materially supplements the action of the shoulder 22 in locking the hose against accidental withdrawal from the coupling assembly. This supplemental locking action may be desirable in certain installations wherein the hose must resist strong forces tending to pull it axially from the coupling connection.

In Fig. 6 there is illustrated still another embodiment of the invention. In this instance a split ring member 45 is used as a supplementary locking means in place of the rib 40 as in Fig. 5, and the threads of the coupling bore are also cut away at 35 as in the embodiment of Fig. 4. In assembling this form of construction the covering material of the hose is first removed to expose the extreme end convolutions of the tubing as described with reference to Fig. 5. The locking ring 45 is then arranged in position upon the tubing after which the coupling body portion 17 is contracted and the clamping member brought into engagement with the hose end as before. The core of the hose may be spirally or annularly formed as desired. In the event spiral wound or spirally corrugated tubing is employed, the split ring will be of the type shown in Fig. 7, and can be threaded into position upon the tubing. In the event annularly corrugated tubing, as in Fig. 1, is employed, a ring 46 split as indicated in Fig. 8 may be employed and arranged upon the tubing at the desired position. The ring locking member supplements the action of the locking shoulder 22, positively preventing withdrawal of the hose from the coupling assembly.

It is obvious that various modifications may be made in the embodiments of the invention heretofore described for purposes of illustration without departing from the scope or spirit of the invention. The invention is therefore not to be limited to the precise embodiments shown and described, but only as indicated in the following claims.

The invention is hereby claimed as follows:

1. In a hose connection, a cylindrical coupling body having an outer section thereof of less internal diameter than an adjacent inner section whereby to provide a shoulder therebetween, a hose arranged within the sections of the coupling body, said hose having a core of multiple convolution metal tubing, the tubing convolutions within the outer section of the coupling body having been deformed to a diameter less than the normal diameter of the tubing convolutions and the convolutions within said adjacent inner section of the coupling body having been radially expanded to a diameter sufficiently greater than normal to produce permanent deformation of the metal resulting in the positive locking of said last named convolutions against said coupling shoulder.

2. The method of making a hose connection which comprises arranging a hose having a core of multiple metal tubing convolutions within a cylindrical coupling body having outer and inner sections, contracting the outer section of the coupling body whereby to produce an internal shoulder on the coupling body between said outer and inner sections, simultaneously deforming the tubing convolutions within said outer coupling body section to a diameter less than the normal diameter of said convolutions, and increasing the diameter of the tubing convolutions within the inner section of said coupling body to a diameter sufficiently greater than normal to produce permanent deformation of the metal resulting in the positive locking of said last named convolutions against the coupling shoulder.

3. The method of making a hose connection which comprises arranging a hose having a core of multiple metal tubing convolutions within a cylindrical coupling body having outer and inner sections, contracting the outer section of the coupling body whereby to produce an internal shoulder on the coupling body between said outer and inner sections, simultaneously deforming the tubing convolutions within said section to a diameter less than the normal diameter of said convolutions, and axially compressing a series of convolutions within the adjacent inner section of the coupling body whereby to thrust the hose wall into tight engagement against said inner coupling section and to increase the diameter of said axially compressed convolutions to a diameter greater than normal, the metal of said last named convolutions being permanently deformed to produce a positive locking of the convolutions against the coupling shoulder.

4. The method of making a hose connection which comprises arranging a locking ring upon a piece of tubing at an intermediate point thereon, arranging the tubing and ring within a cylindrical coupling body, compressing an outer portion of the coupling body into engagement with the tubing on one side of the ring, and expanding the tubing on the other side of the ring into engagement with an inner portion of the coupling body.

5. In a hose connection, a cylindrical coupling body having an outer section of reduced diameter and an adjacent inner section of larger diameter, a tubing arranged within the coupling having a section of reduced diameter within the outer section of the coupling body, and an adjacent section of larger diameter within the adjacent inner section of the coupling body, and a narrow ring provided as a separable element in locking engagement with the tubing and arranged thereon at a point between said coupling sections.

6. A hose connection as defined in claim 5 wherein the tubing is arranged with a series of helical convolutions and the ring is of helical shape and arranged between said convolutions.

7. A hose connection as defined in claim 5 wherein the tubing is arranged with a series of annular convolutions and the ring is of annular shape and arranged between said convolutions.

8. In a hose connection, a cylindrical coupling member, a hose arranged within the coupling member, said coupling member having an outer section thereof of smaller diameter than an adjacent inner section and said hose having a section of less than normal diameter arranged within the outer section of the coupling member and a section of greater than normal diameter arranged within the adjacent inner section of the coupling member, and a narrow annular interlocking member provided as a separable element arranged between said coupling member sections and anchored to the coupling member and to the hose.

9. In a hose connection, a cylindrical coupling member, a hose arranged within the coupling member, said coupling member having an outer section thereof of smaller diameter than an adjacent inner section, an abutment shoulder arranged between said sections, corrugations formed internally of both said coupling sections, said hose having a section of less than normal diameter arranged within the outer section of the coupling member and a section of greater than normal diameter arranged within the adjacent inner section of the coupling member, and a narrow annular interlocking member provided as a separable element anchored to said abutment shoulder and to the hose.

10. In a hose connection, a cylindrical coupling member having an outer section thereof of smaller diameter than an adjacent inner section, a hose of convoluted tubing arranged within said coupling member, said hose having a section of smaller diameter arranged within the outer section of the coupling member and a section of larger diameter arranged within the inner section of the coupling member, and an interlocking member anchored to the coupling member between the outer and inner sections thereof, said interlocking member being mounted on the hose between a pair of adjacent convolutions thereof whereby to be firmly anchored to said convolutions.

11. A hose connection as defined in claim 1 wherein a clamping member is provided threaded into the bore of the coupling body and engaging the radially expanded tubing convolutions to effect a seal therewith.

12. The method of making a hose connection which comprises forming a projecting helical rib on the interior bore of a cylindrical coupling body, threading a section of spiral convoluted metal tubing into the bore of the coupling body whereby to bring said rib to an intermediate portion on the tubing in threaded engagement with the convolutions thereof, contracting the coupling body section disposed outwardly of said rib whereby to produce an internal shoulder on the coupling body adjacent said rib, simultaneously deforming the tubing convolutions within said outer coupling body section to a diameter less than the normal diameter of said convolutions, and increasing the diameter of the tubing convolutions within the section of said coupling body disposed inwardly of said rib and shoulder to a diameter sufficiently greater than normal to produce permanent deformation of the metal resulting in the positive locking of said last named convolutions against the coupling shoulder and rib.

JAMES FENTRESS.